US007948595B2

(12) United States Patent
Chung et al.

(10) Patent No.: US 7,948,595 B2
(45) Date of Patent: May 24, 2011

(54) LIQUID CRYSTAL DISPLAY PANEL

(75) Inventors: Te-Chen Chung, Kun Shan (CN); Tean-Sen Jen, Kun Shan (CN)

(73) Assignee: Infovision Optoelectronics (Kunshan) Co., Ltd., Kunshan (CN)

( * ) Notice: Subject to any disclaimer, the term of this patent is extended or adjusted under 35 U.S.C. 154(b) by 359 days.

(21) Appl. No.: 12/191,314

(22) Filed: Aug. 14, 2008

(65) Prior Publication Data

US 2009/0102992 A1 Apr. 23, 2009

(30) Foreign Application Priority Data

Oct. 23, 2007 (CN) .......................... 2007 1 0165613

(51) Int. Cl.
*G02F 1/136* (2006.01)
*G02F 1/1343* (2006.01)

(52) U.S. Cl. ............ 349/139; 349/43; 349/44; 349/141; 345/92

(58) Field of Classification Search .......... 349/139–141, 349/43, 44; 345/92
See application file for complete search history.

(56) References Cited

U.S. PATENT DOCUMENTS

| | | | | |
|---|---|---|---|---|
| 2002/0142505 | A1* | 10/2002 | Hwang et al. | 438/30 |
| 2002/0154084 | A1* | 10/2002 | Tanaka et al. | 345/92 |
| 2005/0162363 | A1* | 7/2005 | Kim | 345/92 |
| 2007/0153199 | A1* | 7/2007 | Tak | 349/141 |
| 2008/0068516 | A1* | 3/2008 | Mori et al. | 348/790 |

FOREIGN PATENT DOCUMENTS

JP 2007298943 A * 11/2007

* cited by examiner

*Primary Examiner* — Julie-Huyen L Ngo
(74) *Attorney, Agent, or Firm* — Perkins Coie LLP

(57) ABSTRACT

The invention discloses a liquid crystal display panel, comprising pixel electrodes, common electrode lines, data lines and scanning lines, wherein at least two of the scanning lines are electrically connected to each other. The liquid crystal display panel has a plurality of conductive sections are disposed above at least part of each of the scanning lines other than said at least two scanning lines and electrically connected to the common electrode lines. The liquid crystal display panel of the invention can use Dot Inversion Driving with low power consumption. Meanwhile, the invention improves consistency of the RC delays on the individual scanning lines, decreases the difference among the RC delays of scanning signals on all of the scanning lines, and thereby achieves uniformity of a display frame on the liquid crystal display panel.

12 Claims, 11 Drawing Sheets

LIQUID CRYSTAL DISPLAY PANEL

TECHNICAL FIELD

The present invention relates to a liquid crystal display panel and a liquid crystal display apparatus, and in particular, to a liquid crystal display panel having low driving power consumption and a uniform display frame.

BACKGROUND

Liquid crystal displays (LCDs) are advantageous in being light, thin, having low power consumption and emitting no radiation, thereby gradually superseding traditional Cathode-Ray Tube (CRT) displays. Today, LCDs have been widely used in electronic products such as high image quality digital televisions, desktop computers, personal digital assistants (PDAs), notebook computers, digital cameras, mobile phones, and the like.

Because liquid crystal molecules may be electrically decomposed when being subjected to an offset voltage for a long time, LCDs typically employ an Alternating Current (AC) driving technique, i.e. data signals are alternated between positive and negative polarities. If a voltage of a pixel electrode is higher than a voltage of a common electrode, the polarity of the data signal is referred to positive polarity, represented by "+"; and conversely if a voltage of the pixel electrode is lower than a voltage of the common electrode, the polarity of the data signal is referred to negative polarity, represented by "−". Currently, the AC driving for LCDs comprise four different driving techniques: Frame Inversion Driving, Row Inversion Driving, Column Inversion Driving and Dot Inversion Driving. The four driving techniques will be simply illustrated as follows.

Referring to FIGS. 1(*a*) and 1(*b*), polarity conversion in Frame Inversion Driving for a LCD panel is shown, wherein the polarity of voltage applied to the liquid crystal molecules between a common electrode and a pixel electrode is repeatedly inverted on a per frame basis. As shown in FIG. 1(*a*), a positive (+) voltage is applied to the liquid crystal molecules corresponding to all pixels in a first frame, and as shown in FIG. 1(*b*), a negative (−) voltage is applied to the liquid crystal molecules corresponding to all pixels in a second frame. However, the light transmittance of the liquid crystal layer cannot remain constant between continuous frames, and thereby causing flickers. Further, in such driving technique, crosstalk easily occurs due to interference between adjacent data.

Referring to FIGS. 2(*a*) and 2(*b*), polarity conversion in Row Inversion Driving for a LCD panel is shown, wherein the polarity of voltage applied to the liquid crystal molecules is repeatedly inverted on the basis of per row. For instance, in one frame, as shown in FIG. 2(*a*), a positive (+) voltage is applied to the liquid crystal molecules corresponding to odd-numbered scanning lines and a negative (−) voltage is applied to the liquid crystal molecules corresponding to even-numbered scanning lines; in the next frame, as shown in FIG. 2(*b*), a negative (−) voltage is applied to the liquid crystal molecules corresponding to odd-numbered scanning lines and a positive (+) voltage is applied to the liquid crystal molecules corresponding to even-numbered scanning lines. Accordingly, the polarities corresponding to neighboring scanning lines are opposite to each other. However, since the voltage with a same polarity is applied to those pixels arranged horizontally, horizontal crosstalk easily occurs.

As can be seen, Frame Inversion Driving and Row Inversion Driving cause many defects in display quality. So most of the current liquid crystal displays employ Dot Inversion as the polarity conversion technique. Referring to FIG. 3(*a*), the polarity conversion technique of Dot Inversion Driving for a LCD panel is shown, wherein the polarities of voltage applied to neighboring pixels alternate pixel by pixel in both vertical and horizontal directions. This inversion technique is advantageous in display quality compared with other inversion techniques, but has the largest power consumption of the above-mentioned techniques. FIG. 3(*b*) illustrates an improved Dot Inversion array substrate arrangement, which only adjusts the connections of pixel units on the basis of Row Inversion to constitute Dot Inversion arrangement. As shown in FIG. 3(*b*), a same scanning line is still connected to pixel electrodes with the same polarities. Therefore, the driving technique of changing the common voltage can be used so as to reduce the voltage change amount required by a data driver and thus reducing power consumption of the LCD panel.

FIG. 4 illustrates a simplified schematic diagram for the LCD panel having the array substrate arrangement shown in FIG. 3(*b*) (for clarity, only the array substrate is shown; a color filter substrate and a liquid crystal layer in the panel are omitted). As shown in FIG. 4, in the LCD panel, there are arranged of N+1 scanning lines G0, G1, . . . GN (wherein N≧1, and the same hereinafter) and a plurality of data lines arranged across the scanning lines, wherein each set of scanning line and data line across the scanning line can be used to control a pixel unit. Character A represents an IC PAD on which a number of pins connected to the scanning lines and data lines are arranged. Character B represents a connecting line, which connects the pins for the scanning lines G0 and GN together in the pad A. Such structure makes it possible to simultaneously apply scanning signals to the scanning lines G0 and GN whose pins are connected when the scanning signals are sent out, and thus data signals can be simultaneously supplied via data lines to both the pixel units in the even-numbered columns being connected to G0 and the pixel units in the odd-numbered columns being connected to GN. The pixel unit comprises a thin film transistor (TFT), a storage capacitor (Cs) and a liquid crystal capacitor (Clc) (the latter two components are not shown). A gate electrode and a source electrode of the TFT are respectively connected to a scanning line and a data line. Scanning signals on the scanning lines control the ON/OFF status of the TFT, so that data signals on the data lines are written into the storage capacitors and the liquid crystal capacitors in the pixel units. A scanning driver sends out the scanning signals on the scanning lines G0, G1, . . . GN in turn, so as to turn ON the TFTs connected to one certain scanning line and turn OFF the TFTs connected to other scanning lines at the same time (here, note that the TFTs connected to the scanning lines G0 and GN are simultaneously turned ON). When the TFTs connected to a certain scanning line are in the ON status, a data driver supplies data signals via data lines to the corresponding pixel units in accordance with the image materials to be displayed. Therefore, by means of repeatedly scanning each scanning line and sending out data signals, the purpose of displaying images can be achieved.

However, each of the scanning lines is a wire having impedance and certain wiring capacitance. Therefore, scanning signals will be affected by RC effect of the scanning lines and the waveforms thereof will be distorted. As such, a difference in luminance or color on the LCD panel between correct and distorted data signals occurs. Moreover, as shown in FIG. 4, the scanning lines G0 and GN are connected together, which increases the parasitic capacitances on the scanning lines G0 and GN and increases the wiring capacitance thereon to be larger than that on other scanning lines, and thus the RC effect (referred to RC delay hereinafter) on the scanning signals on these two scanning lines G0 and GN are more obvious than that on the scanning signals on other scanning lines. As a result, there are large differences between the driving conditions of the pixel units connected to the scanning lines G0 and GN and the pixel units connected to other scanning lines, thereby causing non-uniformity of luminance and color.

Therefore, the display quality of the LCD will be significantly improved if the influence on uniformity of the display frame on the LCD panel due to the differences of RC delay for individual scanning lines can be avoided.

SUMMARY OF THE INVENTION

In an embodiment of the invention a novel LCD panel is provided, which not only can be applicable to Dot Inversion Driving with low power consumption, but also has the consistency of the RC delay for individual scanning lines increased, and thus suppresses the influence on uniformity of the display frame on the LCD panel due to the differences of RC delay for individual scanning lines.

According to an embodiment of the invention, a LCD panel is provided, which comprises pixel electrodes, common electrode lines, data lines, and scanning lines, at least two scanning lines being electrically connected to each other and a plurality of conductive sections are disposed above at least part of each of the scanning lines other than said at least two scanning lines and electrically communicated with the common electrode lines.

According to another embodiment of the invention, a LCD apparatus is provided, which comprises a plurality of data lines and scanning lines, a plurality of pixel electrodes, a plurality of common electrode lines, and a plurality of conductive sections, wherein part of the scanning lines are electrically connected to each other, and the plurality of conductive sections are respectively disposed above the scanning lines which are not electrically connected with each other and are electrically connected to the common electrode lines.

Also, an embodiment of the invention provides a method for increasing wiring capacitance on a scanning line in a LCD panel, wherein a common electrode line is disposed on a lower array substrate of the liquid crystal display panel and an insulating layer is disposed on the scanning line, the method comprising: disposing a conductive section on the insulating layer above the scanning line and electrically coupling the conductive section to the common electrode line.

An LCD panel in accordance with an embodiment of the invention not only can be applicable to Dot Inversion Driving with low power consumption implemented by changing common voltage, but also has the consistency of the RC delay for individual scanning lines increased, and thereby the differences of RC delay for individual scanning lines are reduced, the uniformity of the display frame on the LCD panel is ensured and the display quality of the LCD is improved.

The method for increasing wiring capacitance on a scanning line in a LCD panel in accordance with an embodiment of the invention can be applied in those LCD panels having the problem of the RC delay for individual scanning lines being inconsistent, so as to increase the consistency of the RC delay for individual scanning lines and thereby achieve uniformity of the display frame on the LCD panel.

BRIEF DESCRIPTION OF THE DRAWINGS

From the following detailed description to the embodiments, accompanying with the drawings, the present invention will be more apparent. In the drawings, FIGS. 1(*a*) and 1(*b*) are schematic diagrams of a conventional Frame Inversion polarity conversion of a LCD panel;

FIG. 3(*b*) is a schematic diagram of arrangement of a conventional improved Dot Inversion array substrate;

FIG. 5(*b*) is a partly enlarged diagram for a region C in the FIG. 5(*a*);

FIG. 5(*c*) is a partly enlarged diagram for a region D in the FIG. 5(*a*);

FIG. 5(*d*) is a plan view for the arrangement of common lines on a LCD panel according to an embodiment of the invention;

FIG. 7(*b*) is a sectional view of FIG. 5(*b*) taken along Line II-II;

FIG. 7(*c*) is a sectional view of FIG. 5(*b*) taken along Line III-III;

FIG. 8(*b*) is an equivalent circuit diagram for the capacitor in FIG. 7(*b*).

DETAILED DESCRIPTION OF THE EMBODIMENTS

Some illustrative embodiments of the invention will be described as follows with reference to the accompany drawings.

FIG. 5(*a*) is a simplified schematic diagram of a LCD panel according to an embodiment of the invention (for clarity only an array substrate is shown; a color filter substrate and a liquid crystal layer in the panel are omitted). Similar to the LCD panel shown in FIG. 4, in the LCD panel of the embodiment, A represents an IC PAD, and B represents a connecting line that connects the pins for the scanning lines G0 and GN. Scanning signals are simultaneously applied to the scanning lines G0 and GN whose pins are connected when the scanning signals are sent out, and thus data signals can be simultaneously supplied via data lines to both the pixel units in the even-numbered columns being connected to G0 and the pixel units in the odd-numbered columns being connected to GN. The LCD panel according to the embodiment comprises a number of scanning lines G0-GN, a number of data lines S0-SM and a number of pixel units 60.

Figure 1A:
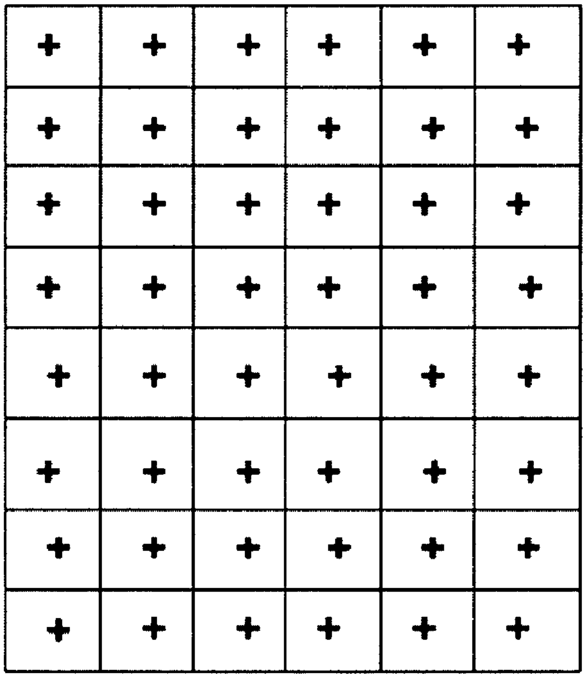
FIG.1(a) (Prior Art)
Figure 1B:
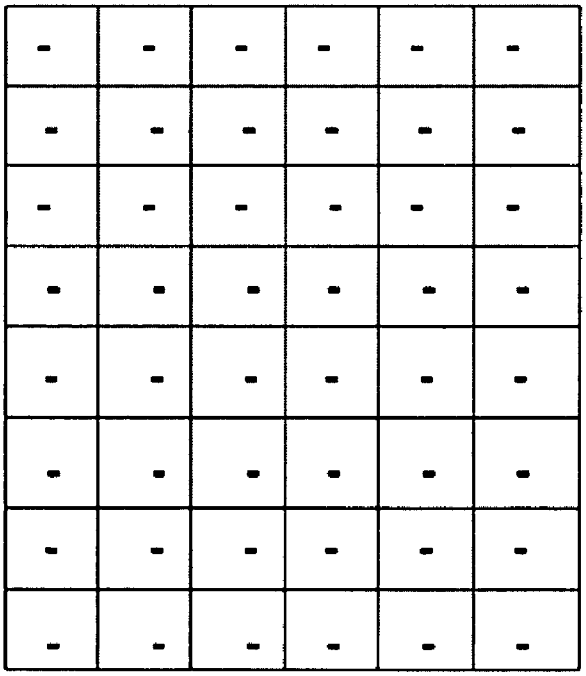
FIG.1(b) (Prior Art)
Figure 2A:
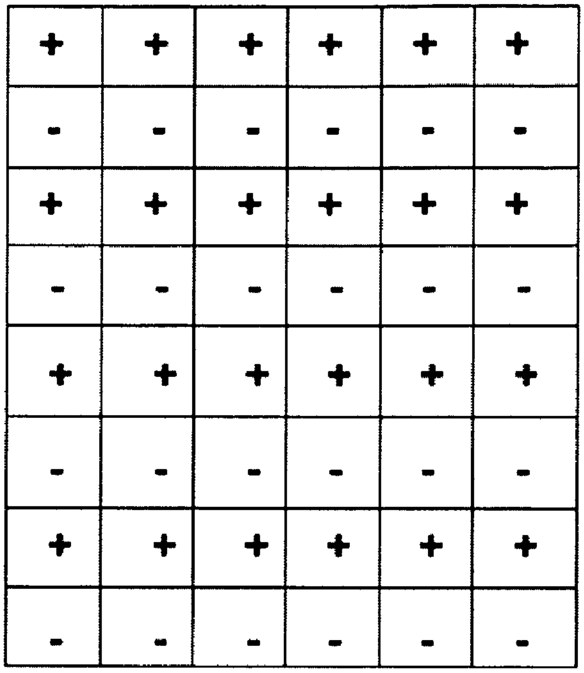
FIG.2(a) (Prior Art)
FIGS. 2(*a*) and 2(*b*) are schematic diagrams of a conventional Row Inversion polarity conversion of a LCD panel.
Figure 2B:
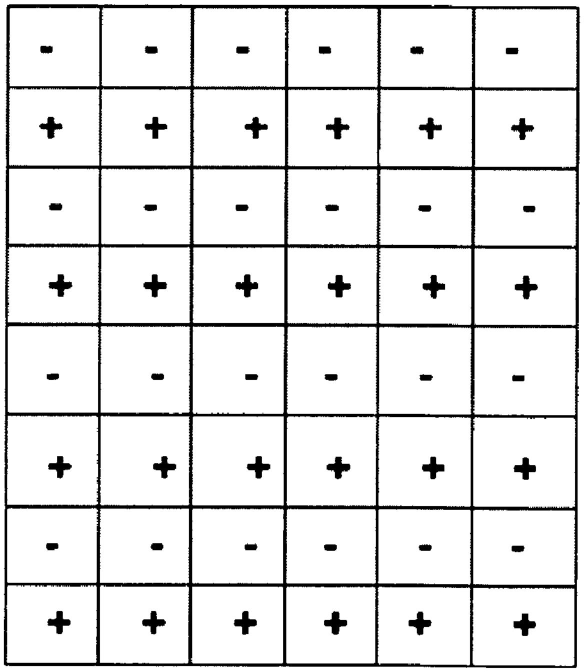
FIG.2(b) (Prior Art)
Figure 3A:
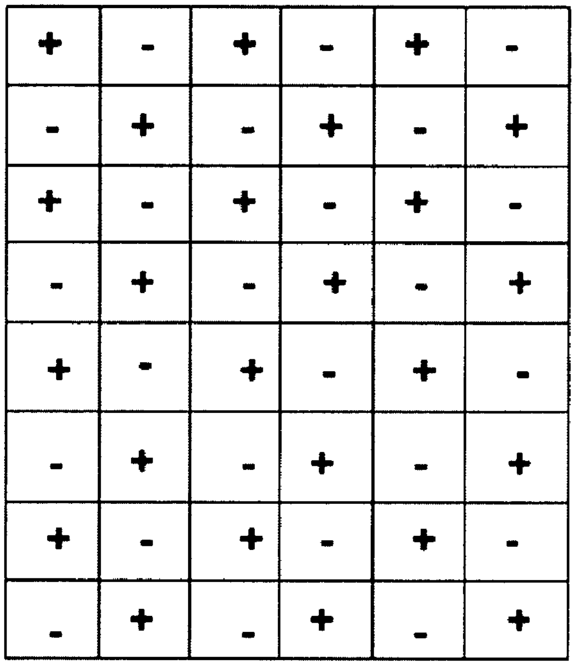
FIG.3(a) (Prior Art)
FIG. 3(*a*) is a schematic diagram of a conventional Dot Inversion polarity conversion of a LCD panel.
Figure 3B:
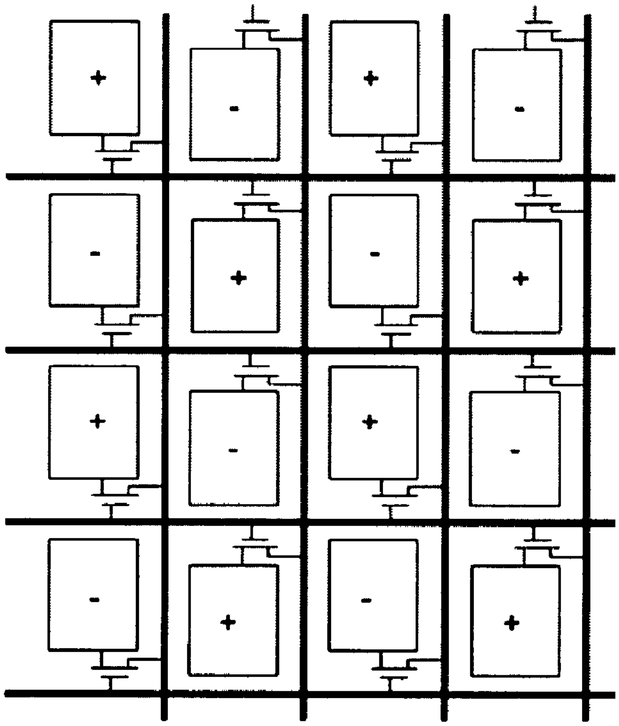
FIG.3(b) (Prior Art)
Figure 4:
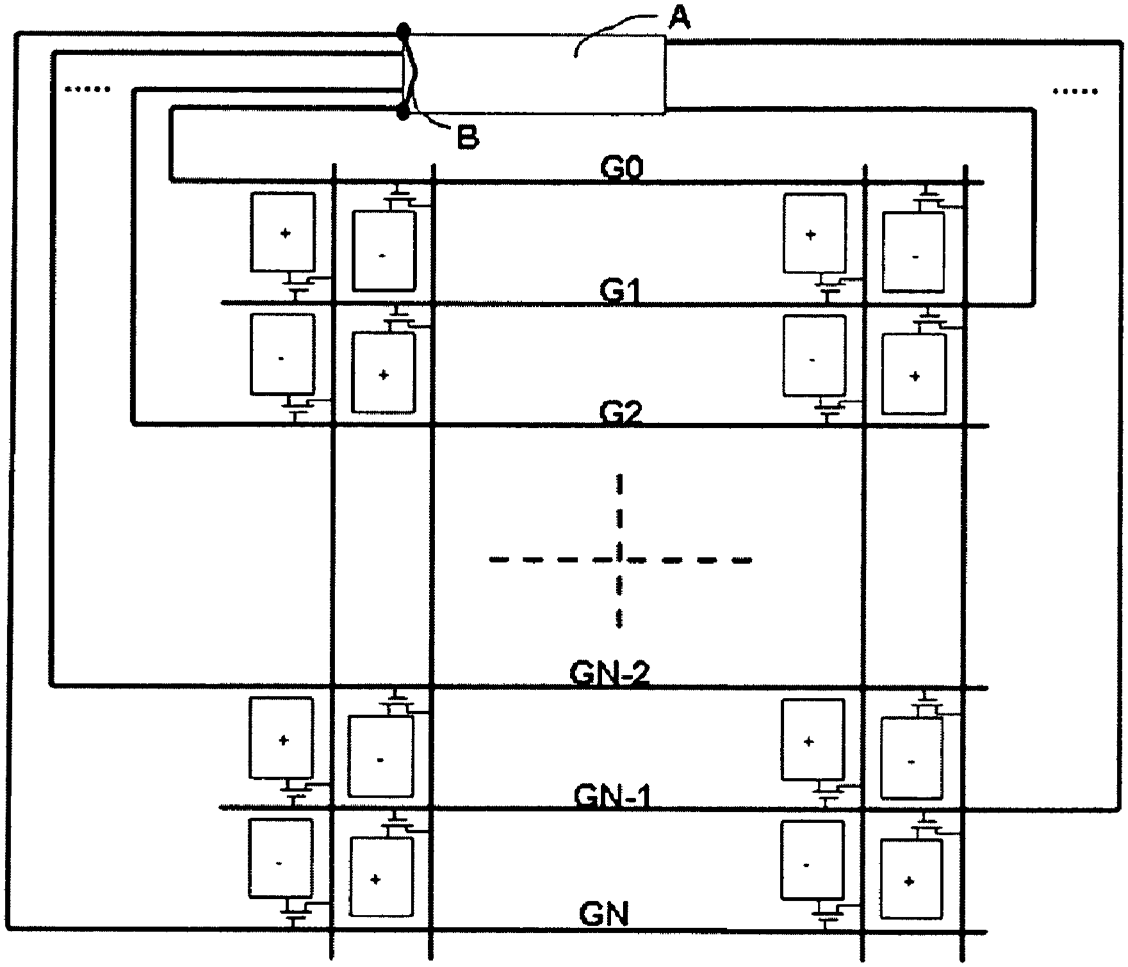
FIG.4 (Prior Art)
FIG. 4 is a simplified schematic diagram of a LCD panel having the array substrate arrangement as shown in FIG. 3(*b*)
Figure 5A:
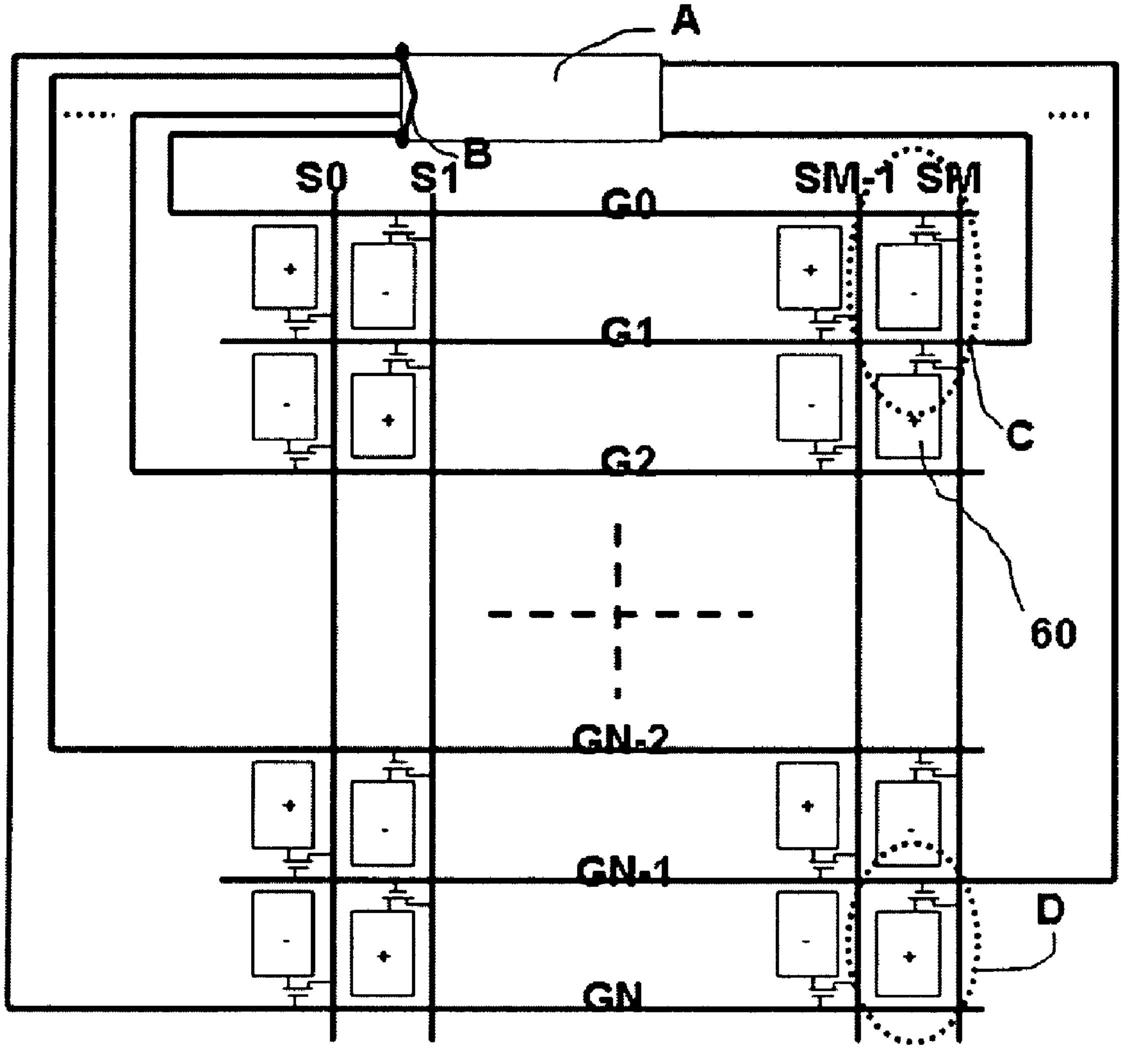
FIG. 5(*a*) is a simplified schematic diagram of a LCD panel according to an embodiment of the invention.
Figure 5B:
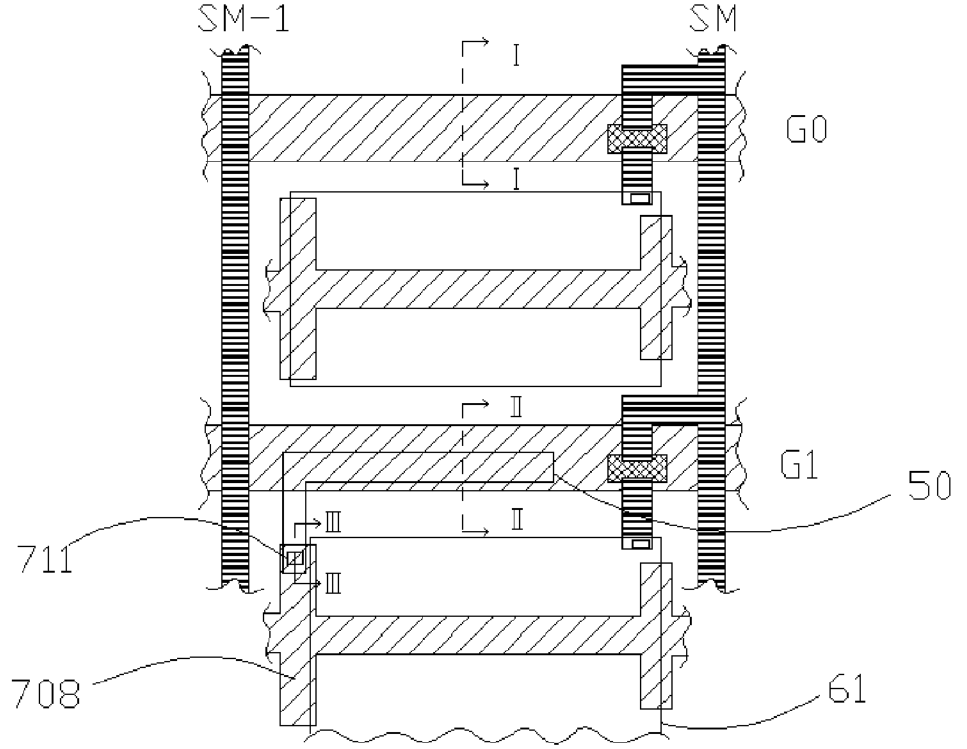
Figure 5C:
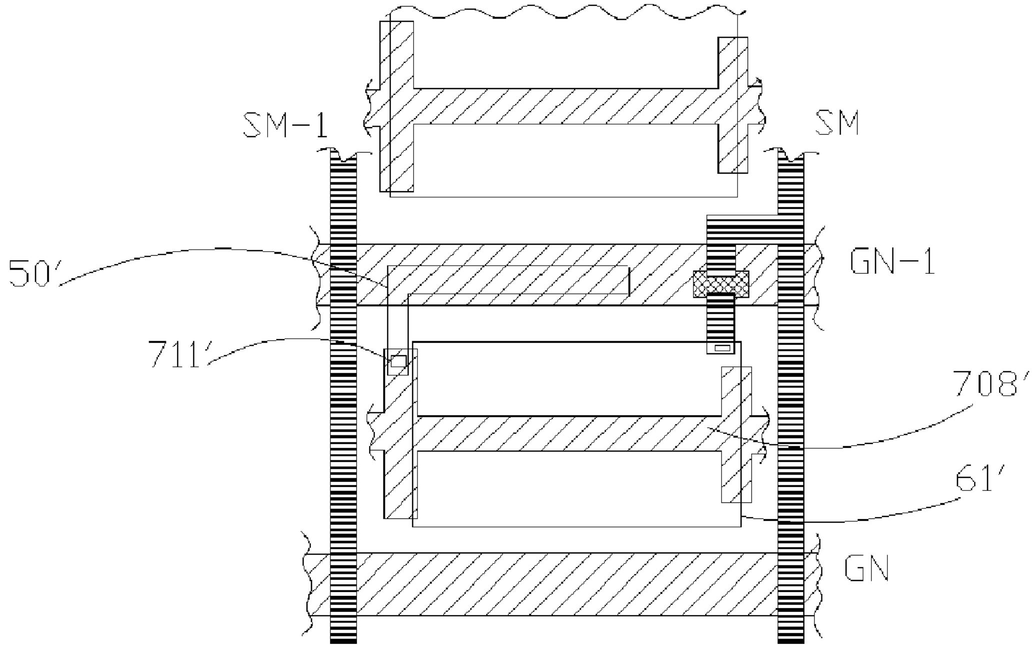
Figure 5D:
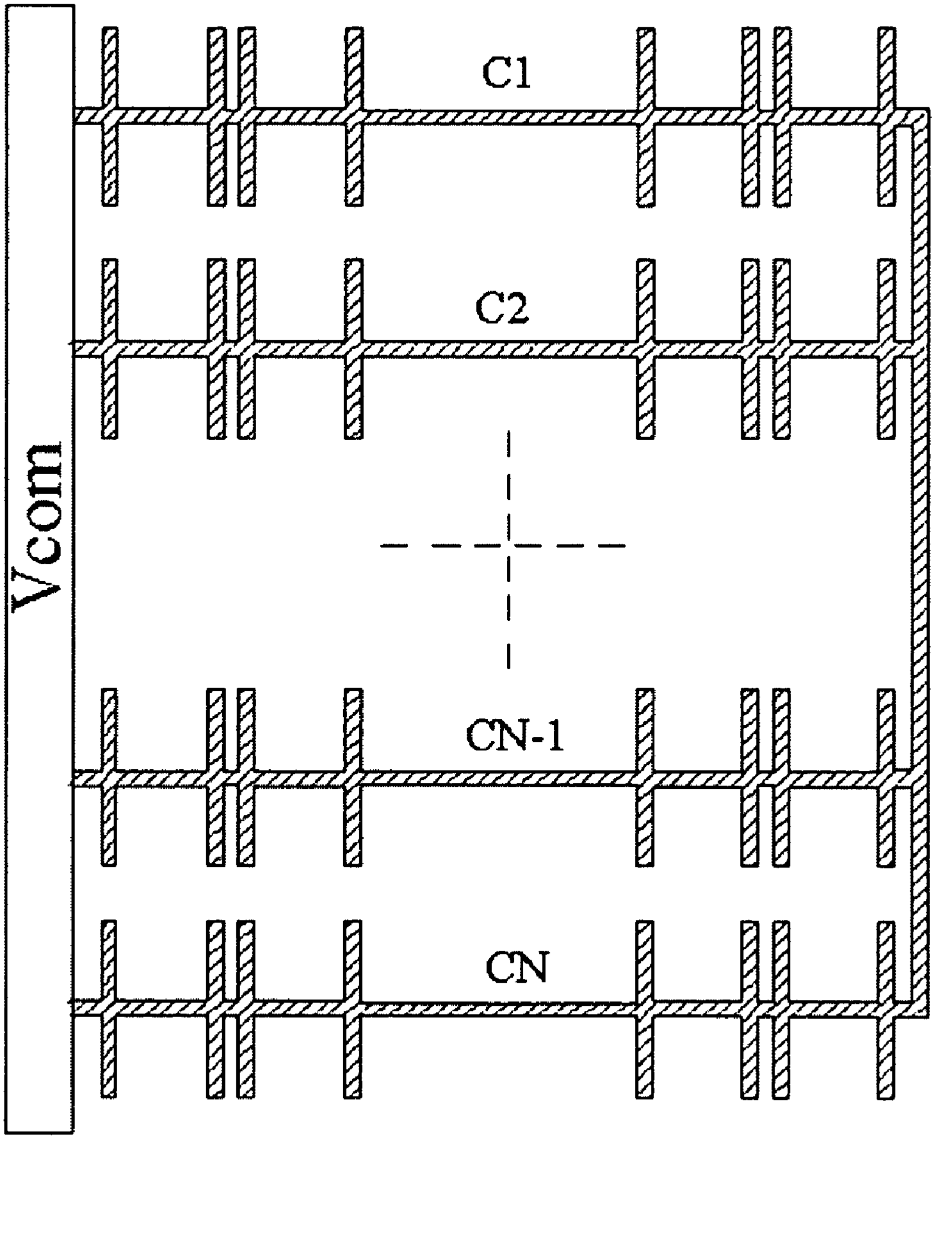

Below, the improvement of the LCD panel according to the embodiment relative to the LCD panel shown in FIG. 4 will be described by referring to FIG. 5(*b*) and FIG. 5(*c*). FIG. 5(*b*) is a partly enlarged diagram for a region C in the FIG. 5(*a*), wherein a reference number 50 indicates a conductive layer, a reference number 61 indicates a pixel electrode, a reference number 708 indicates a common electrode line and a reference number 711 indicates a through-hole. As illustrated in FIG. 5(*b*), the conductive layer 50 is connected to the common electrode line 708 via the through-hole 711, and disposed above at least a part of the scanning line G1, while there is no conductive layer disposed above the scanning line G0. Herein, please note that the conductive section corresponds to the conductive layer in this embodiment, but is not limited to the structure of a conductive layer. FIG. 5(*c*) is a partly enlarged diagram for a region D in the FIG. 5(*a*), wherein a reference number 50' indicates a conductive layer, a reference number 61' indicates a pixel electrode, a reference number 708' indicates a common electrode line and a reference number 711' indicates a through-hole. As illustrated in FIG. 5(*c*), the conductive layer 50' is connected to the common electrode line 708' via the through-hole 711', and disposed above at least a part of the scanning line GN−1, while there is no conductive layer disposed above the scanning line GN. In addition, a conductive layer is disposed similarly above at least a part of each of the scanning lines G2 to GN−2, so the detailed description is omitted in order to simplify the description of the LCD panel shown in FIG. 5(*a*). Meanwhile, please note that with respect to the entire LCD panel, as shown in FIG. 5(*d*), there are totally N common electrode lines (C1, C2, . . . , CN) and all of the N common electrode lines are in electrical communication with each other, wherein a storage capacitor Cs is formed between a pixel electrode and a common electrode line.

Figure 6:
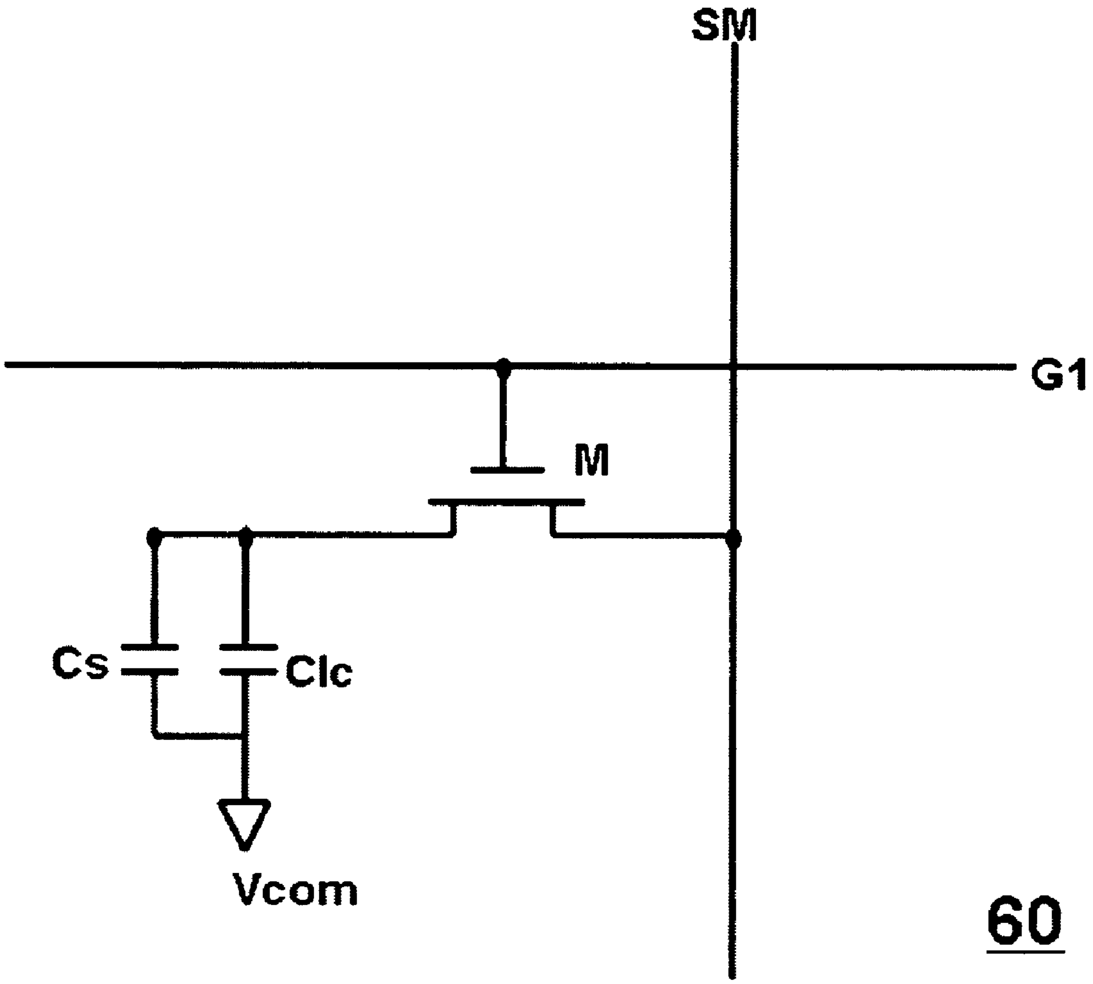
FIG. 6 is a circuit diagram for a single pixel unit on a LCD panel according to an embodiment of the invention.

FIG. 6 is a circuit diagram of a single pixel unit on the LCD panel according to an embodiment of the invention. The pixel unit 60 comprises a thin film transistor M, a liquid crystal capacitor Clc and a storage capacitor Cs. A gate electrode of the thin film transistor M is coupled to the scanning line G1, so as to accept scanning signals transmitted through the scanning line G1. A first terminal of the liquid crystal capacitor Clc, i.e. a pixel electrode (not shown), is coupled to a data line SM, while a second terminal of the liquid crystal capacitor, i.e. a common electrode (not shown) disposed on an upper glass substrate of the LCD panel, is configured to receive the common voltage signal Vcom. A first terminal of the storage capacitor Cs, i.e. the pixel electrode (not shown), is coupled to the first terminal of the liquid crystal capacitor Clc, while a second terminal of the storage capacitor Cs, i.e. a common electrode line (not shown) disposed on a lower glass substrate of the LCD panel, is configured to receive the common voltage signal Vcom. When a scanning signal turns the thin film transistor M on, a data signal is transmitted to the first terminal of the liquid crystal capacitor Clc and the first terminal of the storage capacitor Cs via the thin film transistor M.

Figure 7A:
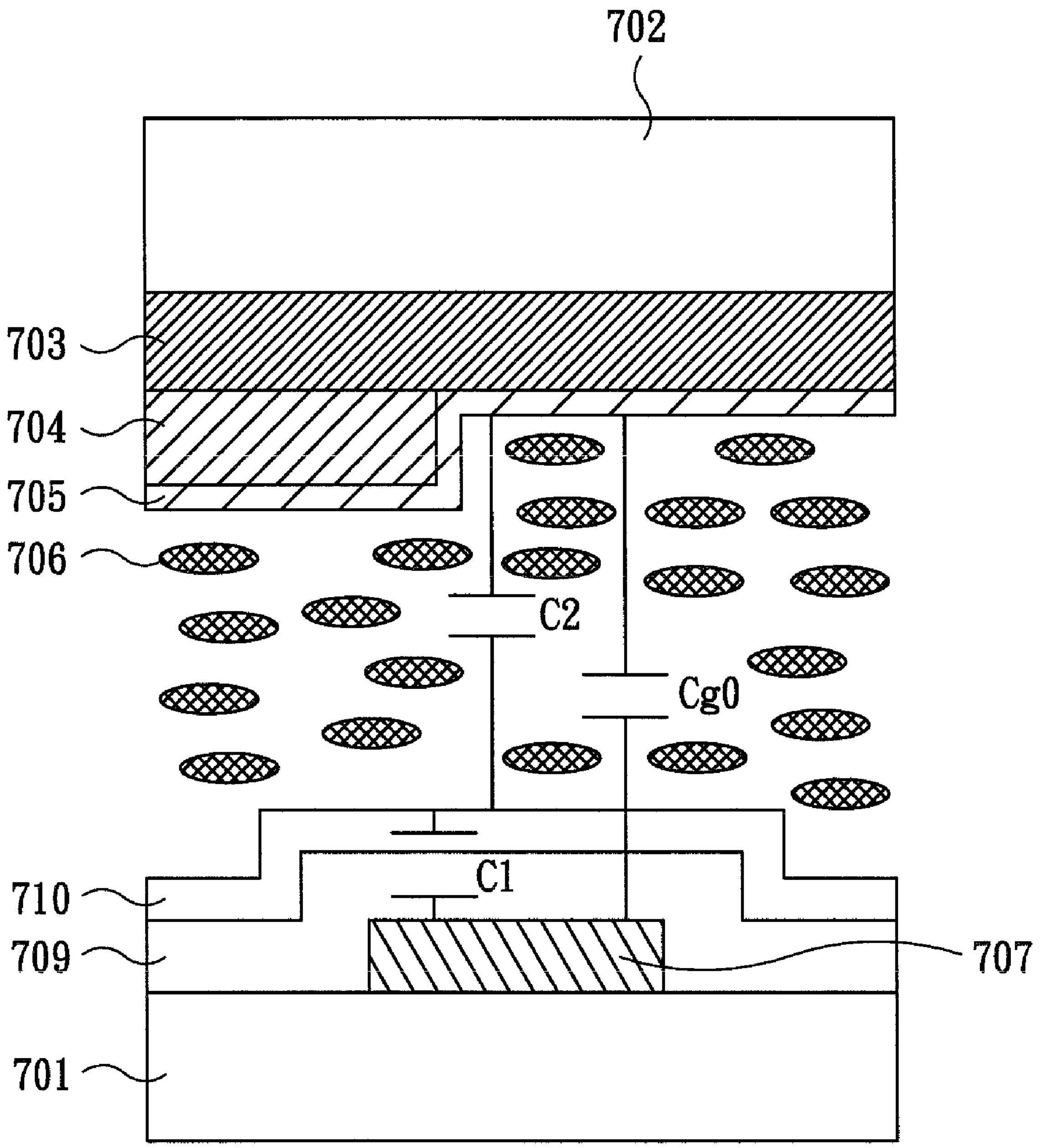
FIG. 7(*a*) is a sectional view of FIG. 5(*b*) taken along Line I-I.
Figure 7B:
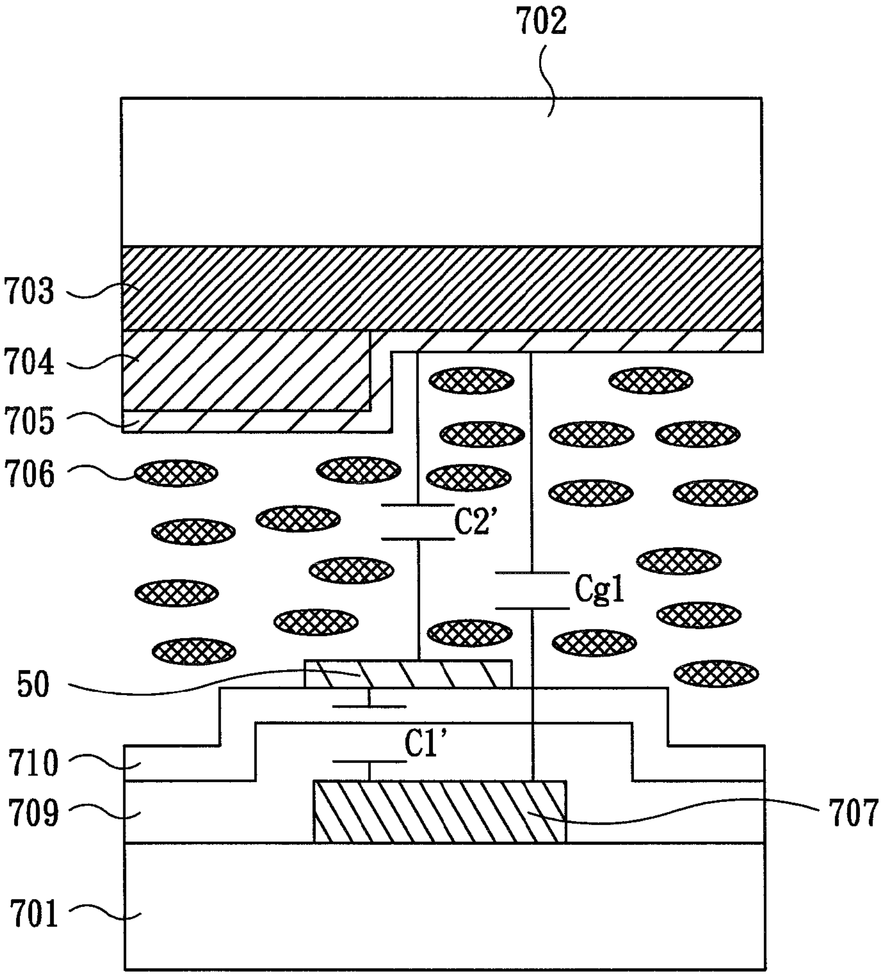

FIGS. 7(*a*)-7(*c*) depict partly sectional views of the LCD panel according to an embodiment of the invention. First, as illustrated in FIG. 7(*a*), which is the sectional view of FIG. 5(*b*) taken along Line I-I, i.e. a vertical sectional view at the scanning line G0, an array substrate, a color filter substrate and a liquid crystal layer are shown, wherein the array substrate comprises a lower glass substrate 701, a scanning line 707 (i.e. the scanning line G0), a gate insulating layer 709 and a passivation layer 710. The color filter substrate comprises an upper glass substrate 702, a black matrix (BM) 703, a color filter 704 and a common electrode 705. The liquid crystal layer is constituted by a mass of liquid crystal molecules. As shown in FIG. 7(*b*), which is a sectional view of FIG. 5(*b*) taken along Line II-II, i.e. a vertical sectional view at the scanning line G1, an array substrate, a color filter substrate and a liquid crystal layer are shown. Compared with FIG. 7(*a*), the configuration shown in FIG. 7(*b*) only differs in that a conductive layer 50 made of Indium-Tin Oxide (ITO) disposed on the passivation layer 710 above the scanning line 707. Herein, please note that the conductive layer is not be limited to ITO, and other conductive metal materials can be used in addition to or in place of ITO. Also, the conductive layer 50 herein is only disposed on the passivation layer 710 above the scanning line 707 in an embodiment, and the positional relationship between the conductive layer 50 and the scanning line 707 is not limited to this. For example, the conductive layer 50 can also be disposed on the gate insulating layer 709. As illustrated in FIG. 7(*c*), which is a sectional view of FIG. 5(*b*) taken along Line III-III, i.e. a vertical sectional view of the part which connects the conductive layer 50 and the common electrode line 708, the reference number 708 indicates a common electrode line, the reference number 709 indicates a gate insulating layer, the reference number 710 indicates a passivation layer, the reference number 711 indicates a through-hole. The conductive layer 50 is connected to the common electrode line 708 via the through-hole 711 so that the conductive layer 50 is in electrical communication with the common electrode line 708 and also receives the common voltage signal Vcom.

The following is a description of the delay of scanning signals on individual scanning lines in the LCD panel. The delay time constant of a scanning signal is T=Rg×Cg, wherein Rg is the wiring resistance of each scanning line and Cg is the wiring capacitance of each scanning line. As explained above, since the connection of the scanning lines G0 and GN makes the wiring capacitances of both the scanning lines larger than that on other scanning lines, the inconsistence of the delay of the scanning signals occurs. In this embodiment, the consistence of the delay of the scanning signals gets increased by adjusting the wiring capacitances Cg on other scanning lines. The detailed description is as follows.

Please note that only a part of the wiring capacitance of a scanning line is considered by the present embodiment, i.e., the capacitor between the scanning line and the common electrode in the color filter substrate, while other wiring capacitances relating to the scanning line will be not considered since the structural change provided by the embodiment of the invention has no influence on other wiring capacitances. As such, the wiring capacitance hereinafter mentioned should correspond to the wiring capacitance of the scanning line according to the embodiment of the invention.

Figure 7C:
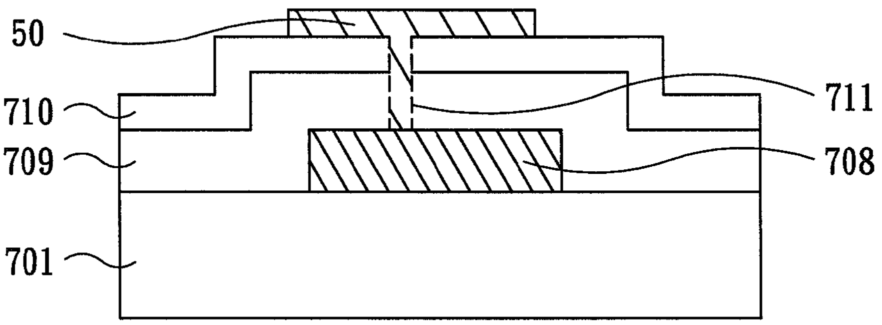
Figure 8A:
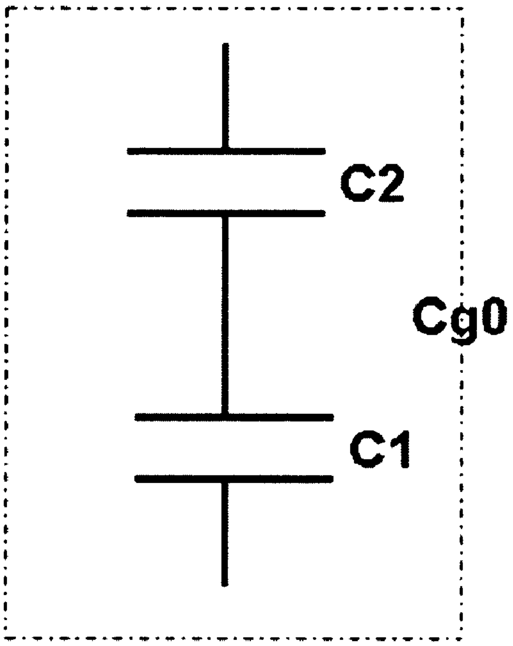
FIG. 8(*a*) is an equivalent circuit diagram for the capacitor in FIG. 7(*a*)

With respect to the scanning lines G0 and GN, since the values of the wiring capacitances of the scanning lines GN and G0, Cgn and Cg0, are equivalent, the embodiment only describes the wiring capacitance of the scanning line G0 and capacitor Cg0. Referring to FIG. 7(*a*), Cg0 is the capacitor formed by the gate insulating layer 709, the passivation layer 710 and the liquid crystal layer 706 being sandwiched between the scanning line 707 and the common electrode 705 on the color filter substrate. When calculating the value of Cg0, Cg0 can be regarded as being formed by the series connection of the capacitor C1 having the dielectric layer composed of the gate insulating layer 709 and the passivation layer 710 and the liquid crystal capacitor C2, and the equivalent circuit diagram of Cg0 is shown in FIG. 8(*a*), i.e, $$\frac{1}{Cg0} = \frac{1}{C1} + \frac{1}{C2}, \quad (1)$$

wherein, C2 is the liquid crystal capacitor formed by the liquid crystal molecules that are sandwiched between the opposite regions of the scanning line 707 and the common electrode 705 as a dielectric material.

Figure 8B:
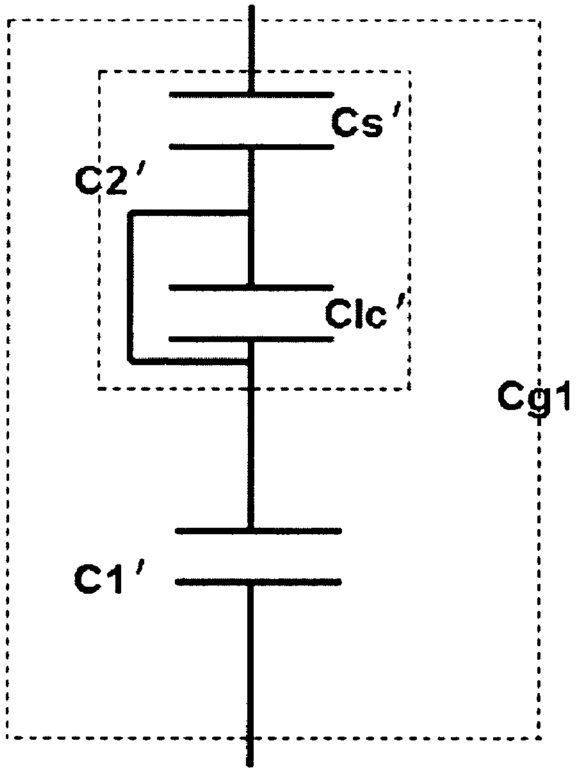

With respect to the scanning lines G1 to GN−1, since the wiring capacitance of each scanning line has a same value, the embodiment only describes the wiring capacitance of the scanning line G1 and capacitor Cg1. Referring to FIG. 7(*b*), the conductive layer 50 disposed on the passivation layer 710 above the scanning line 707 makes the wiring capacitances of the scanning lines G1 to GN−1 different from that in the conventional structure above. Here, Cg1 is formed by the series connection of the capacitor C1' between the scanning line 707 and the conductive layer 50 and the capacitor C2' between the conductive layer 50 and the common electrode 705, and the equivalent circuit diagram is shown in FIG. 8(b), i.e.

$$\frac{1}{Cg1} = \frac{1}{C1'} + \frac{1}{C2'}, \quad (2)$$

wherein, C1' is the capacitor formed by the gate insulating layer 709 and the passivation layer 710 being sandwiched between the scanning line 707 and the conductive layer 50, and thus C1'≈C1. As for the capacitor C2', the capacitor C2' comprises the liquid crystal capacitor Clc' formed by the liquid crystal molecules being sandwiched between the conductive layer 50 and the common electrode 705. Referring to FIG. 7(c), because the conductive layer 50 is electrically communicated with the common electrode line 708 via the through-hole 711 to receive the common voltage signal Vcom, and the common electrode 705 also receives the common voltage signal Vcom as illustrated in FIG. 6, the conductive layer 50 has the same electrical potential as that of the common electrode 705 and thereby the Clc' formed by the liquid crystal molecules being sandwiched between the conductive layer 50 and the common electrode 705 is short-circuited. Further, in addition to the Clc' formed by the liquid crystal molecules being sandwiched between the conductive layer 50 and the common electrode 705, referring to FIG. 5(b), since the conductive layer 50 is in electrical communication with the common electrode line 708, the storage capacitor Cs between the common electrode line 708 and the pixel electrode 61 is connected to the liquid crystal capacitor Clc' in series via the conductive layer 50 and constitutes another part of the abovementioned capacitor C2'. Please note that, although the conductive layer 50 is only connected to one common electrode line, it can be understood from the above description related to FIG. 5(a), FIG. 5(c) and FIG. 5(d) that all of the common electrode lines on the LCD panel are in electrical communication with each other and thus the storage capacitors formed by all of the common electrode lines throughout the whole LCD panel and all of the pixel electrodes will influence the wiring capacitor on the scanning line G1, that is, the storage capacitors are connected in series in the wiring capacitor on the scanning line G1. Then, this storage capacitor is actually equivalent to the parallel connection of the storage capacitors corresponding to all the pixel units on the LCD panel. Thereby the N×M storage capacitors on the whole panel are connected in series in the wiring capacitor of the scanning line G1, that is, the capacitance of the another part of the capacitor C2' is (N×M)Cs which is represented by Cs' herein. Therefore, given the above analysis, the equivalent circuit diagram of the wiring capacitor Cg1 on the scanning line G1 is illustrated in FIG. 8(b), and C2'=Cs'.

Then, $$Cg1 = \frac{C1' \times C2'}{C1' + C2'}$$

can be derived from the formula (2)

$$\frac{1}{Cg1} = \frac{1}{C1'} + \frac{1}{C2'}.$$

Since C1'≈C1 and C2'=Cs', $$Cg1 \approx \frac{C1 \times Cs'}{C1 + Cs'}.$$

Moreover, is it well-known technical knowledge in the art that Cs'=N×MCs>>C1. For example, as for a LCD panel with a panel size of 6.2 inches and a resolution of 234×480 pixels, the storage capacitor Cs=456 fF, the number of scanning lines N=480, the number of data lines M=234×3, Cs'=(456×480×234×3)fF and C1=(234×3×131.6)fF, so it can be seen that Cs'>>C1. Thus, $$Cg1 \approx \frac{C1 \times Cs'}{Cs'} = C1.$$

Meanwhile, from the formula (1)

$$\frac{1}{Cg0} = \frac{1}{C1} + \frac{1}{C2},$$

it can be known that the capacitance value of the Cg0 obtained by the series connection of the capacitors C1 and C2 is smaller than any of the capacitance values of C1 and C2, i.e. Cg0<C1. Therefore, it can be derived that Cg1>Cg0.

As a result, with the improved structure in accordance with the embodiment of the invention, the wiring capacitor on the scanning lines G1 to GN−1 can be increased and thus the RC delay on each of the scanning lines G1 to GN−1 can be increased. Therefore, the consistency of the RC delay on each of the scanning lines G0-GN can be improved. Here, a LCD panel with a panel size of 6.2 inches, a resolution of 234×480 pixels and the panel structure as described in the embodiment is taken as an example to illustrate the effect resulted from the invention. As for such LCD panel, when the conductive layer 50 is not provided, the RC delay on each of the scanning lines G0 and GN is about 0.598 μs, and the RC delay on each of the scanning lines G1 to GN−1 is about 0.505 μs, while when the conductive layer 50 is provided in accordance with the structure described in the embodiment, the RC delay on each of the scanning lines G0 and GN maintains about 0.598 μs, but the RC delay on each of the scanning lines G1 to GN−1 is changed to about 0.570 μs. As can be seen, on the LCD panel according to the invention, the consistency of the RC delay on each of the scanning lines G0 and GN and other scanning lines G1 to GN−1 is effectively improved.

From the above description of the embodiment of the invention, it can be seen that the difference among the RC delays of the scanning signals on all of the scanning lines can be reduced, and thereby the uniformity of the LCD display frame can be ensured and the display quality of the LCD can be effectively improved.

In addition, it will be appreciated by those of ordinary skill in the art that the structure for increasing the wiring capacitance on a scanning line provided by the invention is also applicable to other LCD panels, so as to solve the problem of inconsistency of the RC delay on each of the scanning lines due to other reasons or to solve other related problems.

Although a particular embodiment has been described to illustrate the principles and implementation of the invention, the description is only for explanation of the spirit and idea of the invention, but not to limit the scope of the invention. Meanwhile, various modifications and alternatives to the above embodiment within the scope of the invention are apparent for those of ordinary skill in the art, as long as such modifications and alternatives fall into the scope as defined by the appended claims and the equivalents thereof.

What is claimed is:

1. A liquid crystal display panel, comprising:

scanning lines, the first scanning line and the last scanning line of the scanning lines being electrically connected to each other; and a plurality of conductive sections each of which is disposed above at least part of each of the other scanning lines that are different from the first scanning line and the last scanning line and is electrically connected to respective electrode line.

2. The liquid crystal display panel according to claim 1, wherein an insulating layer is disposed on the scanning lines and each of the plurality of conductive sections is disposed on the insulating layer above the respective scanning line.

3. The liquid crystal display panel according to claim 2, wherein the insulating layer comprises a passivation layer.

4. The liquid crystal display panel according to claim 1, wherein the plurality of conductive sections are formed by Indium-Tin Oxide.

5. The liquid crystal display panel according to claim 1, wherein the plurality of conductive sections are connected to the common electrode lines via through-holes.

6. A liquid crystal display apparatus comprising a liquid crystal display panel, the liquid crystal display panel comprising:

scanning lines, the first scanning line and the last scanning line of the scanning lines being electrically connected to each other; and a plurality of conductive sections each of which is disposed above at least part of each of the other scanning lines that are different from the first scanning line and the last scanning line and is electrically connected to respective common electrode line.

7. The liquid crystal display apparatus according to claim 6, wherein an insulating layer is disposed on the scanning lines and each of the plurality of conductive sections is disposed on the insulating layer above the respective scanning line.

8. The liquid crystal display apparatus according to claim 7, wherein the insulating layer comprises a passivation layer and t each of the plurality of conductive sections is disposed on the passivation layer above the respective scanning line.

9. The liquid crystal display apparatus according to claim 7, wherein the insulating layer comprises a gate insulating layer and a passivation layer, and each of the plurality of conductive sections is disposed on the gate insulating layer above the respective scanning line.

10. The liquid crystal display apparatus according to claim 6, wherein the liquid crystal display apparatus employs Dot Inversion Driving.

11. The liquid crystal display apparatus according to claim 10, wherein each of the scanning lines is connected to pixel electrodes having the same driving polarities.

12. The liquid crystal display apparatus according to claim 10, wherein the Dot Inversion Driving is adapted to be implemented by changing a common voltage.

* * * * *